United States Patent
Ballal et al.

(10) Patent No.: US 10,135,368 B2
(45) Date of Patent: Nov. 20, 2018

(54) TORQUE RIPPLE CANCELLATION ALGORITHM INVOLVING SUPPLY VOLTAGE LIMIT CONSTRAINT

(71) Applicant: STEERING SOLUTIONS IP HOLDING CORPORATION, Saginaw, MI (US)

(72) Inventors: Siddharth Ballal, Shelby Township, MI (US); Prerit Pramod, Saginaw, MI (US); Julie A. Kleinau, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/283,340

(22) Filed: Oct. 1, 2016

(65) Prior Publication Data

US 2018/0097461 A1 Apr. 5, 2018

(51) Int. Cl.
 *H02P 21/00* (2016.01)
 *H02P 6/10* (2006.01)
 *H02P 21/22* (2016.01)

(52) U.S. Cl.
 CPC ............... *H02P 6/10* (2013.01); *H02P 21/22* (2016.02)

(58) Field of Classification Search
 CPC .......... H02K 9/03; H02K 21/24; H02K 1/276; B62D 5/046; H02P 21/06
 See application file for complete search history.

(56) References Cited

U.S. PATENT DOCUMENTS

| | | | |
|---|---|---|---|
| 4,713,596 A | 12/1987 | Bose | |
| 4,733,149 A | 3/1988 | Culberson | |
| 4,920,306 A | 4/1990 | Mard et al. | |
| 5,196,778 A | 3/1993 | Hayashida | |
| 5,223,775 A | 6/1993 | Mongeau | |
| 5,410,234 A | 4/1995 | Shibata et al. | |
| 5,652,495 A | 7/1997 | Narazaki et al. | |

(Continued)

FOREIGN PATENT DOCUMENTS

| | | | |
|---|---|---|---|
| CN | 1675099 A | 9/2005 | |
| CN | 1741368 A | 3/2006 | |

(Continued)

OTHER PUBLICATIONS

OA dated Jul. 17, 2017.

(Continued)

*Primary Examiner* — Shawki S Ismail
*Assistant Examiner* — Zoheb Imtiaz
(74) *Attorney, Agent, or Firm* — Cantor Colburn LLP

(57) ABSTRACT

A system for reducing a torque ripple cancellation command is provided and includes a current regulator that provides motor voltage commands to a motor, and a torque ripple cancellation module that generates a torque ripple cancellation command based on input currents to the current regulator. A ramp-down command generator module that provides a ramp-down command to the torque ripple cancellation module is also provided. The ramp-down command is based on a voltage saturation indicator, and a voltage saturation indicator generator that generates a voltage saturation indicator signal. The voltage saturation indicator signal is based on a supply voltage signal and a motor voltage command.

8 Claims, 4 Drawing Sheets

(56) References Cited

U.S. PATENT DOCUMENTS

| | | |
|---|---|---|
| 5,927,430 A | 7/1999 | Mukai et al. |
| 5,962,999 A | 10/1999 | Nakamura et al. |
| 6,002,234 A | 12/1999 | Ohm et al. |
| 6,021,251 A | 2/2000 | Hammer et al. |
| 6,104,148 A | 8/2000 | Kumar et al. |
| 6,152,254 A | 11/2000 | Phillips |
| 6,161,068 A | 12/2000 | Kurishige et al. |
| 6,222,334 B1 | 4/2001 | Tamagawa et al. |
| 6,288,515 B1 | 9/2001 | Hiti et al. |
| 6,370,459 B1 | 4/2002 | Phillips |
| 6,465,975 B1 | 10/2002 | Naidu |
| 6,499,559 B2 | 12/2002 | Mc Cann et al. |
| 6,605,912 B1 | 8/2003 | Bharadwaj et al. |
| 6,700,342 B2 | 3/2004 | Hampo et al. |
| 6,900,607 B2 | 5/2005 | Kleinau et al. |
| 7,034,493 B2 | 4/2006 | Yoshimoto et al. |
| 7,071,649 B2 | 7/2006 | Shafer et al. |
| 7,145,310 B2 | 12/2006 | Ihm et al. |
| 7,199,549 B2 | 4/2007 | Kleinau et al. |
| 7,207,412 B2 | 4/2007 | Uryu |
| 7,394,214 B2 | 7/2008 | Endo et al. |
| 7,548,035 B2 | 6/2009 | Endo et al. |
| 7,576,506 B2 | 9/2009 | Kleinau et al. |
| 7,952,308 B2 | 5/2011 | Schulz et al. |
| 8,633,766 B2 | 1/2014 | Khlat et al. |
| 8,896,244 B2 | 11/2014 | Kleinau |
| 2002/0175649 A1 | 11/2002 | Reutlinger |
| 2003/0076065 A1 | 4/2003 | Shafer et al. |
| 2003/0146041 A1 | 8/2003 | Kanda |
| 2004/0095089 A1 | 5/2004 | Collier-Hallman |
| 2004/0195993 A1 | 10/2004 | Yoshimoto et al. |
| 2005/0073280 A1 | 4/2005 | Yoshinaga et al. |
| 2006/0000209 A1 | 1/2006 | Tsuda et al. |
| 2006/0100766 A1 | 5/2006 | Schwarz et al. |
| 2006/0113929 A1 | 6/2006 | Delange et al. |
| 2006/0122751 A1 | 6/2006 | Oyama et al. |
| 2006/0145639 A1* | 7/2006 | Song .............. H02P 6/28 318/400.26 |
| 2007/0043490 A1 | 2/2007 | Yokota et al. |
| 2007/0046126 A1 | 3/2007 | Sagoo et al. |
| 2007/0103105 A1 | 5/2007 | Endo et al. |
| 2007/0132446 A1 | 6/2007 | Kleinau et al. |
| 2007/0177314 A1 | 8/2007 | Weng et al. |
| 2007/0278032 A1 | 12/2007 | Sakaguchi et al. |
| 2008/0067960 A1* | 3/2008 | Maeda .............. B62D 5/046 318/400.02 |
| 2008/0167779 A1 | 7/2008 | Suzuki |
| 2008/0191656 A1 | 8/2008 | Satake et al. |
| 2008/0265808 A1* | 10/2008 | Sparey .............. H02P 6/182 318/139 |
| 2009/0026994 A1 | 1/2009 | Namuduri et al. |
| 2009/0027000 A1 | 1/2009 | Gallegos-Lopez et al. |
| 2009/0069979 A1 | 3/2009 | Yamashita et al. |
| 2009/0114470 A1 | 5/2009 | Shimizu et al. |
| 2009/0115362 A1 | 5/2009 | Saha et al. |
| 2009/0189555 A1 | 7/2009 | Chen |
| 2009/0224710 A1 | 9/2009 | Mir |
| 2009/0234538 A1 | 9/2009 | Ta et al. |
| 2009/0267555 A1 | 10/2009 | Schulz et al. |
| 2010/0140003 A1 | 6/2010 | Saha et al. |
| 2010/0153162 A1 | 6/2010 | Tam et al. |
| 2010/0231148 A1 | 9/2010 | Tobari et al. |
| 2011/0018281 A1 | 1/2011 | Tan et al. |
| 2011/0127934 A1* | 6/2011 | Suzuki .............. B62D 5/046 318/400.02 |
| 2011/0156632 A1 | 6/2011 | Cheng et al. |
| 2011/0169432 A1 | 7/2011 | Dean |
| 2011/0175556 A1 | 7/2011 | Tobari et al. |
| 2011/0204833 A1 | 8/2011 | Santo et al. |
| 2011/0231066 A1* | 9/2011 | Ohno .............. B62D 5/046 701/42 |
| 2011/0297475 A1* | 12/2011 | Taniguchi .............. B62D 5/046 180/446 |
| 2011/0309781 A1* | 12/2011 | Tomigashi .............. H02P 21/13 318/504 |
| 2012/0112549 A1 | 5/2012 | Perisic et al. |
| 2012/0221208 A1 | 8/2012 | Kojo et al. |
| 2012/0313701 A1 | 12/2012 | Khlat et al. |
| 2013/0013154 A1 | 1/2013 | Aoki |
| 2013/0154524 A1 | 6/2013 | Kleinau |
| 2013/0187579 A1 | 7/2013 | Rozman et al. |
| 2013/0261896 A1 | 10/2013 | Gebregergis et al. |
| 2013/0285591 A1 | 10/2013 | Suzuki |
| 2014/0191699 A1 | 7/2014 | Dixon |
| 2014/0239860 A1 | 8/2014 | Kleinau |
| 2014/0265961 A1 | 9/2014 | Gebregergis et al. |
| 2014/0265962 A1 | 9/2014 | Gebregergis et al. |
| 2014/0285129 A1* | 9/2014 | Maeda .............. G05D 13/62 318/400.22 |
| 2014/0375239 A1 | 12/2014 | Kim et al. |
| 2015/0069941 A1* | 3/2015 | Iwaji .............. H02P 6/18 318/400.11 |
| 2015/0155811 A1 | 6/2015 | Merienne |
| 2015/0194919 A1* | 7/2015 | Merienne .............. H02P 21/141 318/400.02 |
| 2015/0222210 A1 | 8/2015 | Kleinau et al. |
| 2015/0372623 A1 | 12/2015 | Pramod et al. |
| 2016/0056745 A1* | 2/2016 | Ootake .............. H02P 21/14 318/400.02 |
| 2016/0229449 A1 | 8/2016 | Kleinau et al. |

FOREIGN PATENT DOCUMENTS

| | | |
|---|---|---|
| CN | 101218146 A | 7/2008 |
| CN | 101399516 B | 4/2009 |
| CN | 101456429 A | 6/2009 |
| CN | 101615791 A | 12/2009 |
| CN | 101981804 A | 2/2011 |
| CN | 102570476 A | 7/2012 |
| CN | 102582679 A | 7/2012 |
| CN | 102751936 A | 10/2012 |
| EP | 1378419 A2 | 1/2004 |
| EP | 1768252 A1 | 1/2006 |
| EP | 1720242 A1 | 11/2006 |
| EP | 1914878 A2 | 4/2008 |
| EP | 2003010 A2 | 12/2008 |
| EP | 2293428 A1 | 10/2009 |
| JP | 2000108916 A | 4/2000 |
| JP | 2001247049 A | 9/2001 |
| JP | 2003170850 A | 6/2003 |
| JP | 2007137272 A | 6/2007 |
| JP | 2008143200 A | 6/2008 |
| JP | 2012224258 A | 11/2012 |
| NO | 2014006329 A2 | 1/2014 |

OTHER PUBLICATIONS

Chinese Office Action for Chinese Application No. 201210599015.5 dated Oct. 23, 2014; 29 pages.
Chinese Office Action for Chinese Patent Application No. 201310104183.7 dated Jan. 6, 2015.
Chinese Office Action for Chinese Patent Application No. 2014100892259, dated Jan. 13, 2017.
English translation of office action issued in related CN Application No. 201400942309, dated Jan. 18, 2016, 14 pages.
EP Search Report for related EP Application No. EP12196930.7; dated Mar. 22, 2013; 7 pages.
EP SR issued May 12, 2017.
EO SR issued Aug. 1, 2017.
EPSR Issue Aug. 1, 2017.
European Search Report from related Application No. 15171189: dated Jan. 4, 2016; 9 pages.
Extended European search report for related European application No. 16153434.2, dated Jul. 6, 2016, pp. 8.
F. Briz, et al. "Analysis and Design of current Regulators Using Complex Vectors", IEEE Industry Applications Society Annual Meeting, New Orleans, Louisiana; Oct. 5-9, 1997, pp. 1504-1511.
Jeong et al., "Fault Detection and Fault-Tolerant Control of Interior Permanent-Magnet Motor Drive System for Electric Vehicle", IEEE

(56) References Cited

OTHER PUBLICATIONS

Transactions on Industry Applications, vol. 41, No. 1, Jan./Feb. 2005, pp. 46-51.
Kirtley, J.; "6.061 Introduction to Electric Power Systems, Class Notes Chapter 12 Permanent Magnet 'Brushless DC'" Motors, Massachussetts Institute of Technology, Department of Electrical Engineering and Computer Science, Spring 2011.
L. Harnefors, et al., "Model-Based Current Control of AC Machines Using the Internal Model Control Method", IEEE Transactions on Industry Applications, vol. 34, No. 1, Jan./Feb. 1998, pp. 133-141.
Madani, et al; "Reduction of Torque Pulsations by Inductance Harmonics Identification of a Permanent-Magent Synchronous Machine"; IEEE Conference New York; Sep. 28, 1995; 6 pages.
OA Issued Oct. 6, 2017.
OA Issued Jul. 21, 2017.
Office Action dated Jan. 18, 2016.
Othce Action dated Jan. 18, 2016.
Office Action dated Dec. 9, 2016.
Office Action dated Dec. 8, 2015.
Office Action dated Aug. 16, 2016.
Office Action issued in related CN Application No. 201400942309, dated Jan. 18, 2016, 18 pages.
Office Action dated Jul. 7, 2016.
Office Action, dated Jan. 6, 2015.
Li Yituo et al., PMSM current harmonics suppression based on feedforward compensation, Journal of Tsinghua University (Science and Technology), Mar. 2012, vol. 52, No. 3, Beijing, China, English Abstract, 1 page.

\* cited by examiner

TORQUE RIPPLE CANCELLATION ALGORITHM INVOLVING SUPPLY VOLTAGE LIMIT CONSTRAINT

BACKGROUND OF THE INVENTION

Field oriented control (FOC) of an electric motor utilizing a current regulator is widely employed in industrial electric drive systems. Electric motors utilized in electric power steering (EPS) applications are generally required to produce very low torque ripple. Thus, the torque ripple produced by an interior permanent magnet synchronous motor (IPMSM) or a surface permanent magnet synchronous motor (SPMSM) may need to be reduced before being used in an EPS application. This can be done using passive machine design techniques, or by employing an active torque ripple cancellation algorithm. Torque ripple cancellation needs a pulsating voltage command in order to generate the cancellation current or torque signal. The amplitude of this pulsating voltage is a function of the synchronous frequency or electrical velocity of the electric motor. As the motor control system approaches the supply voltage limit, the final voltage command must be limited to the maximum available supply voltage. This is because the saturation of voltage commands result in degraded performance of the overall drive system.

The ramp-down of the torque ripple cancellation command is typically achieved through an offline lookup table as a function of synchronous frequency and motor torque or currents. The table is populated based on the calculations performed using worst-case motor parameters and cancellation commands. This open-loop approach does not always result in an optimal ramp down signal, since it does not take in to account the operating condition of the machine. Furthermore, this technique is also memory intensive.

SUMMARY OF THE INVENTION

In one embodiment, a system for reducing a torque ripple cancellation command is provided. It includes a current regulator that provides motor voltage commands to a motor and a torque ripple cancellation module that generates a torque ripple cancellation command based on input currents to the current regulator. A ramp-down command generator module that provides a ramp-down command to the torque ripple cancellation module is also provided. The ramp-down command is based on a voltage saturation indicator, and a voltage saturation indicator generator that generates a voltage saturation indicator signal. The voltage saturation indicator signal is based on a supply voltage signal and a motor voltage command.

In another embodiment, a method for reducing a torque ripple cancellation command is provided. It provides a motor voltage commands to a motor which generates a torque ripple cancellation command based on input currents. A ramp-down command to the torque ripple cancellation module is also provided. The ramp-down command is based on a voltage saturation indicator, and a motor voltage command. It provides a voltage saturation indicator signal. The voltage saturation indicator signal is based on a supply voltage signal and a motor voltage command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
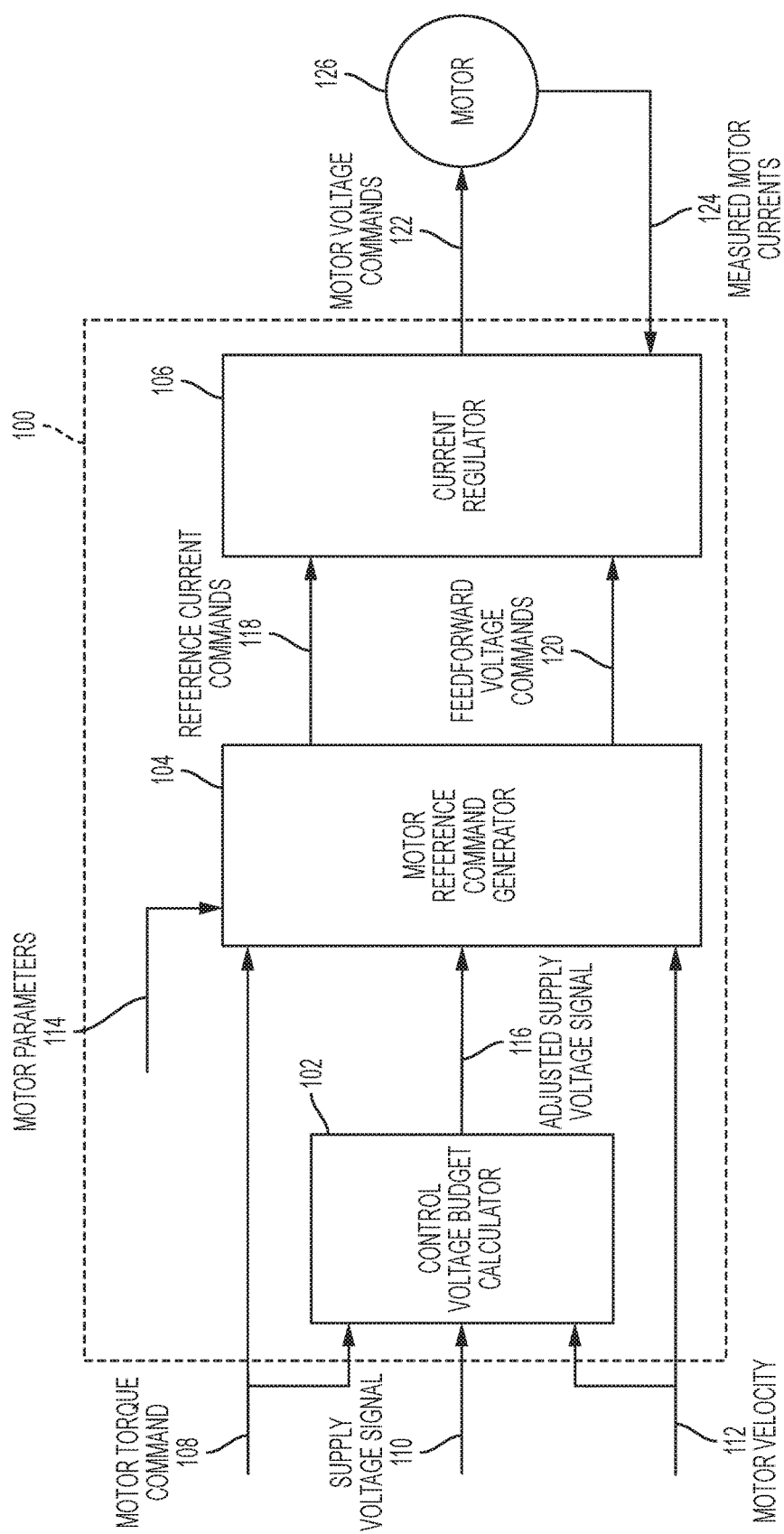
FIG. 1 depicts a schematic diagram of a motor control system in accordance with exemplary embodiments of the invention.

Referring now to the Figures, where the invention will be described with reference to specific embodiments, without limiting same, FIG. 1 depicts a block diagram of a motor control system 100 for an electric motor such as a permanent magnet synchronous machine (PMSM), utilizing phase current measurements in a current control feedback loop in accordance with some embodiments of the invention. As shown, the motor control system 100 includes a control voltage budget calculation module 102, a motor reference command generator module 104, and a current regulator module 106. FIG. 1 also depicts a motor 126. As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 1 may be combined and/or further partitioned.

The control voltage budget determination module 102 determines a control voltage budget value based on at least one of a motor quadrant, the motor velocity signal 112, and a motor torque command 108. A motor quadrant, in some embodiments, is a number between one and four that represents the relationship between the motor torque command 108 and the motor velocity signal 112. The control voltage budget calculation module 102 adjusts the supply voltage signal 110 based on the determined control voltage budget value. In some embodiments, the motor reference command generator module 102 may be connected to a torque ripple cancellation module 138. A configuration with the torque ripple cancellation module 138 will be described below in more detail with reference to FIG. 2.

Some systems may use a preprogrammed, offline lookup table-based method to reduce a torque ripple cancellation command. These systems may calculate the torque ripple cancellation scale factor as a function of motor velocity and a motor torque or current command. The lookup table for the scale factor may be populated based on worst-case motor parameters and supply voltage values, which is memory intensive and provides unreliable selection of the operating condition in real-time operation. Unlike such a torque ripple cancellation ramp-down generated by a motor control system using closed loop current regulators, the system described in FIG. 2 proactively limits the torque ripple cancellation command upon approaching supply voltage saturation.

Figure 2:
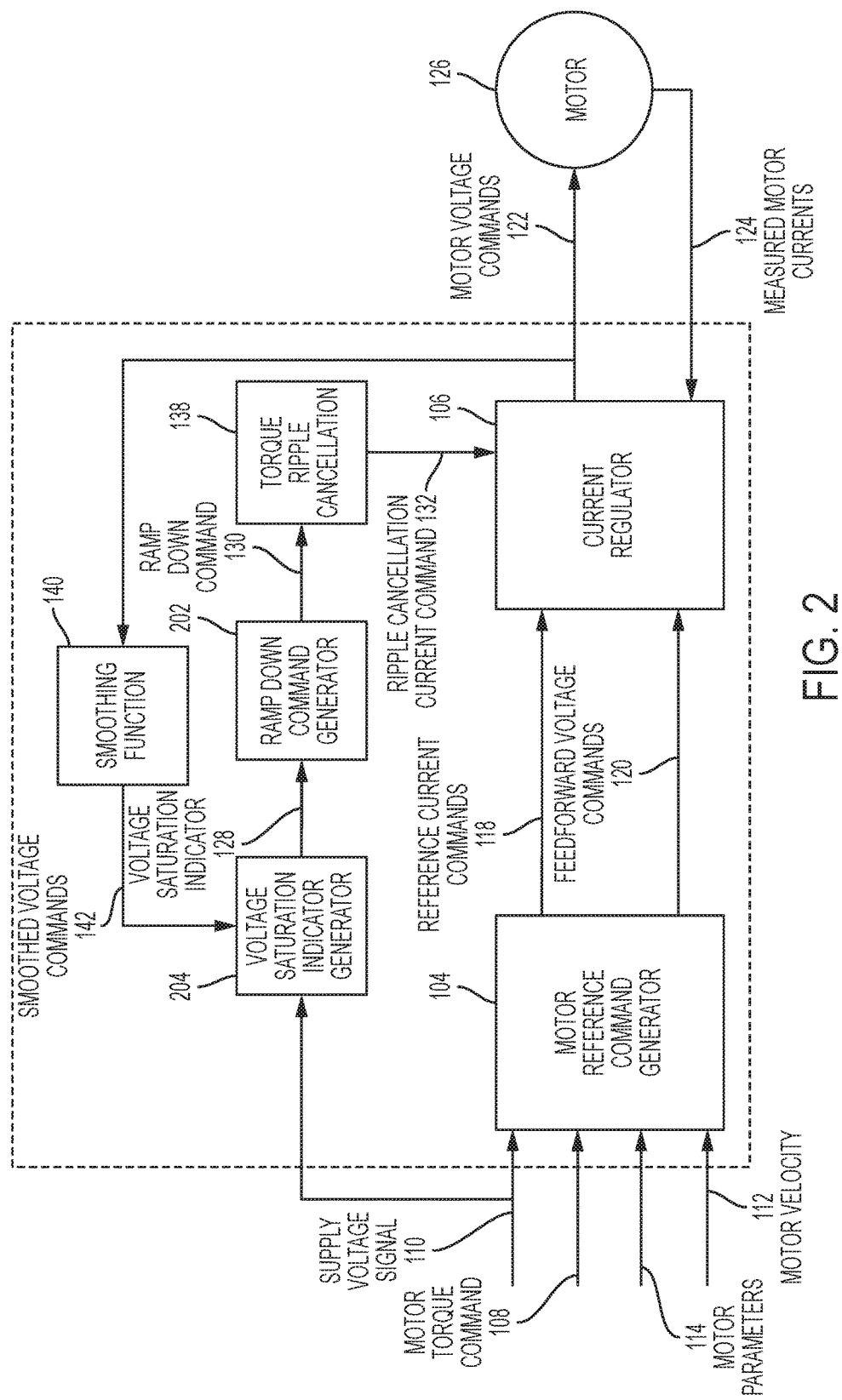
FIG. 2 illustrates a dataflow diagram of a motor control system with an active ramp-down command generator module in accordance with some embodiments of the invention.

In particular, FIG. 2 illustrates a dataflow diagram of a motor control system with a ramp-down command generator module 202. The ramp-down command generator module 202 actively damps the torque ripple cancellation current command as a voltage saturation value is approached. The motor control system described in FIG. 2 includes the motor reference command generation module 104, the current regulator 106, the motor 126, the torque ripple cancellation module 138, the ramp down command generator module 202, and the voltage saturation indicator generation module 204. The ramp down command generator module 202 receives as input a voltage saturation indicator. The ramp down command generator module 202 computes a ramp down scale factor which is then sent to the torque ripple cancellation module 138. The torque ripple cancellation module may use the ramp down scale factor to scale the torque ripple cancellation current commands. The torque ripple cancellation current commands, in general, may consist of a direct-axis (d-axis) and a quadrature-axis (q-axis) current command, which are functions of time. It should be noted that in general all of the current and voltage signals specified here in the description as well as in the figures consist of a d-axis and a q-axis component.

Figure 3:
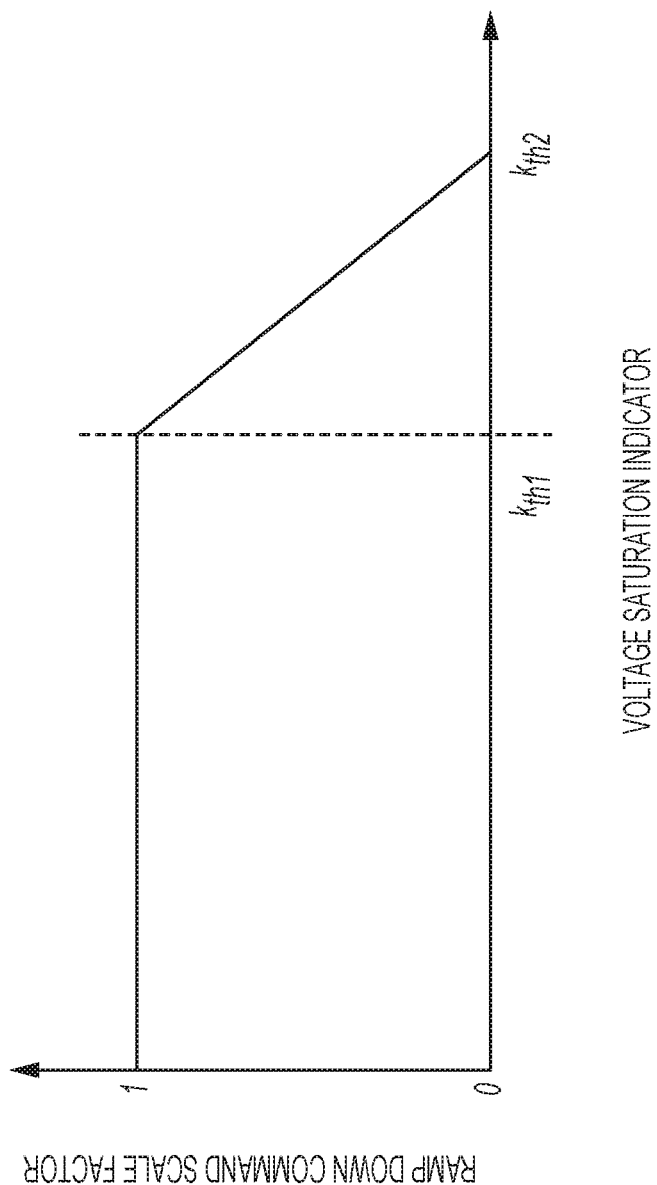
FIG. 3 illustrates a plot of a ramp-down command in accordance with some embodiments.

FIG. 3 illustrates a plot of a ramp down scale factor as a function of the voltage saturation indicator $m_i$ in accordance with some embodiments. The voltage saturation indicator may be calculated from the final voltage outputs of the current regulator or feedforward voltage values (computed using torque or current commands, motor velocity, supply voltage and estimated motor parameters).

A feedforward voltage saturation indicator is calculated as the ratio of the magnitude of the feedforward voltage command and available supply voltage. It should be noted that the feedforward voltages mentioned here refer to those voltage commands that would be applied to the motor when the system is required to be in static feedforward control mode. Such feedforward voltage signals are computed by using an inverse of the motor model with current commands and estimated motor parameters. The available supply voltage can be a total of the voltage at the DC link $V_{DC}$ or an adjusted DC link voltage that accounts for inverter dead time $k_{DT}$ and/or a voltage control budget $V_b$ (as described in N000274). The available supply voltage $V_{av}$ can be written as follows:

$$V_{av} = k_{DT} * V_{DC} - V_b$$

Alternatively or additionally, the voltage saturation indicator signal $m_i$ may be a combination of the final voltage output of the current regulator and the feedforward voltages. The scale factor may be reduced when the modulation factor approaches a first threshold value ($k_{th1}$) and continue to be reduced with a linear trajectory until it reaches a second threshold value ($k_{th2}$).

The calculated $m_i$ signal is compared against two threshold values ($k_{th1}$ and $k_{th2}$). These threshold values are determined based on the operating condition of the machine. The second threshold value ($k_{thresh2}$) can be set to a logic 1 or to a value slightly lower than a logic 1 if an additional safety factor is desired. The first threshold value may calculated as follows:

$$k_{th1} = \left[1 - \frac{V_{rplmax}}{V_{av}}\right]$$

The term $V_{rplmax}$ is the maximum voltage magnitude of the pulsating voltage needed to create the torque ripple cancellation signal. The term $k_{th1}$ can also be calculated using other similar equations.

Although a linear reduction of scale factor is shown in FIG. 3, it is to be appreciated that the scale factor reduction may be non-linear. In addition, the scale factor may be a non-zero value for a modulation index exceeding $k_{th2}$.

Figure 4:
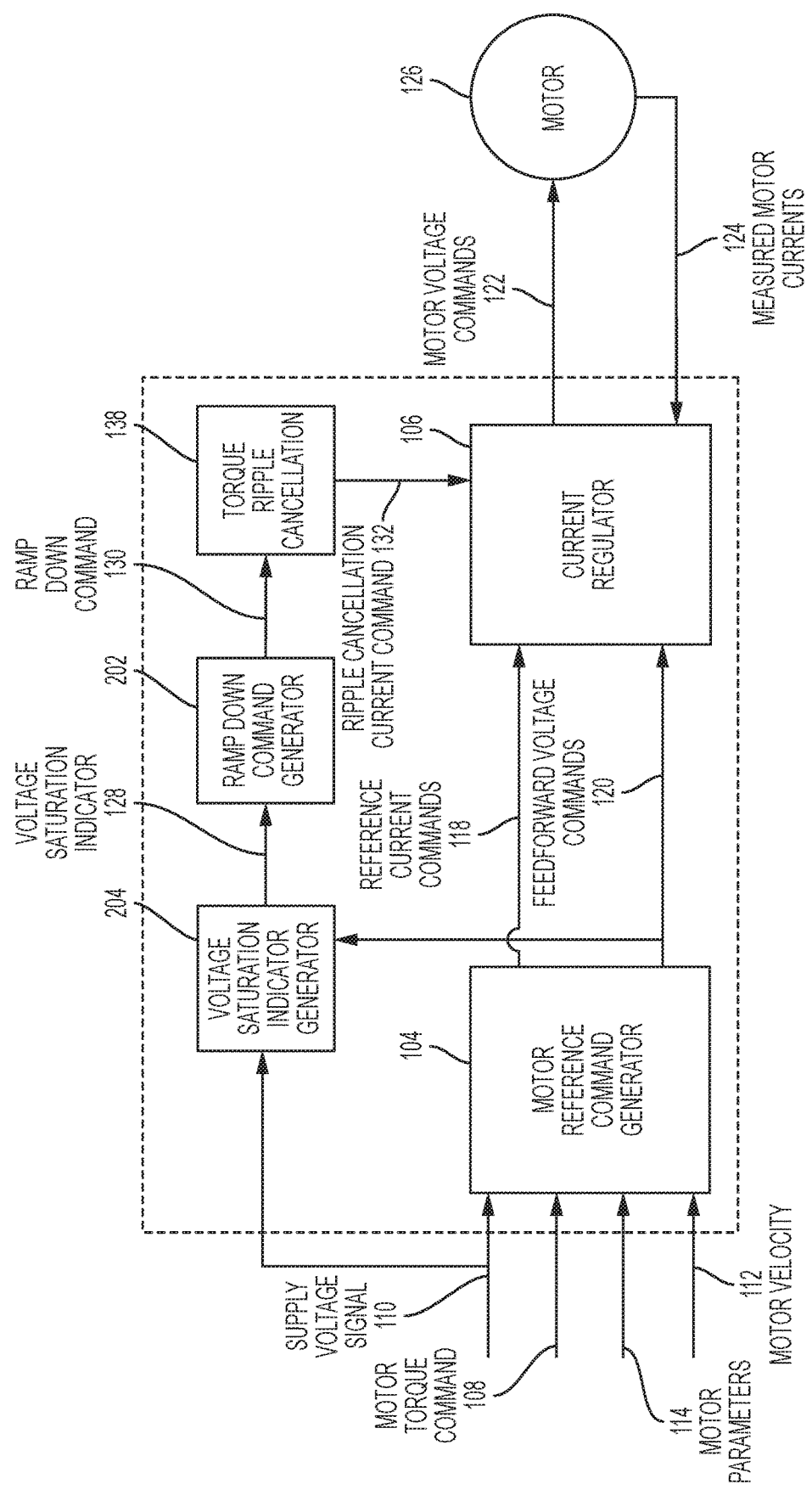
FIG. 4 illustrates a illustrates a dataflow diagram of an active ramp-down command generator module that uses feedforward voltage signals in accordance with some embodiments of the invention.

FIG. 4 illustrates the ramp down command generator module in accordance with a specific embodiment. In particular, the ramp down command generator module receives d-axis and q-axis feedforward voltages $V_{dFF}$ and $V_{qFF}$ from the reference current generator module.

It can be appreciated that a feedforward voltage magnitude command ($V_{FF}$ is calculated from $V_{qFF}$ and $V_{dFF}$ according to the following equation:

$$V_{FF} = \sqrt{V_{dFF}^2 + V_{qFF}^2}$$

Other embodiments of the ramp down command generator module may use a feedback voltage saturation indicator signal, computed from the final voltage commands and the supply voltage signal, instead of the feedforward voltage saturation indicator value. Such an embodiment may improve accuracy of the modulation index signal. This improvement may be the result of the current regulator adjusting the final voltage values to compensate for various errors in the motor control system (including motor parameter errors and inverter non-linearity). However, this implementation may be practical only for low bandwidth systems where the modulation index is not very noisy. For systems with high bandwidth, more sophisticated signal processing techniques for smoothing the feedback voltage saturation indicator signal may be required.

As an example, an RMS (root mean square) or running average of the feedback voltage saturation indicator may be computed and used to calculate the ramp down scale factor. This is possible because the current regulator is typically executed in a loop rate that is several times faster than the loop rate in which the feedforward commands and the ramp down command generator block is executed. Such processing of the feedback voltage saturation indicator results in a less noisy and more accurate signal.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for reducing a torque ripple cancellation command, the system comprising: a current regulator that provides motor voltage commands to a motor; a torque ripple cancellation module that generates a torque ripple cancellation command based on input currents to the current regulator; a ramp-down command generator module that provides a ramp-down command to the torque ripple cancellation module, the ramp-down command is based on a voltage saturation indicator; and a voltage saturation indicator generation module that generates a voltage saturation indicator signal, the voltage saturation indicator is based on a supply voltage signal and a motor voltage command; wherein the ramp-down command is dependent on a first threshold and a second threshold and the ramp-down scale factor is linearly reduced as a function of a voltage saturation indicator signal.

2. The system of claim 1, the voltage saturation indicator is based on feedforward voltage magnitude generated by a motor reference command generator.

3. The system of claim 2, the feedforward voltage magnitude is calculated according to a square root of a sum of a first square of the d-axis feedforward voltage and a second square of the q-axis feedforward voltage.

4. The system of claim 1, the voltage saturation indicator is a final modulation index output of the current regulator.

5. A method for reducing a torque ripple cancellation command, the method comprising: providing motor voltage commands to a motor; generating a torque ripple cancellation command based on input currents; providing a ramp-down command to the torque ripple cancellation module, the ramp-down command is based on a voltage saturation indicator and a motor voltage command; and providing a voltage saturation indicator signal, the voltage saturation indicator signal is based on a supply voltage signal and a motor voltage command; wherein the ramp-down command is dependent on a first threshold and a second threshold and the ramp-down scale factor is linearly reduced as a function of a voltage saturation indicator signal.

6. The method of claim 5, the voltage saturation indicator is based on a feedforward voltage magnitude.

7. The method of claim 6, the feedforward voltage magnitude is calculated according to a square root of a sum of a first square of the d-axis feed forward voltage and a second square of the q-axis feedforward voltage.

8. The method of claim 5, the voltage saturation indicator is based on the final modulation index signal or the final voltage output of the current regulator.

* * * * *